United States Patent
Ogg et al.

(10) Patent No.: US 9,478,806 B2
(45) Date of Patent: *Oct. 25, 2016

(54) IRON ELECTRODE EMPLOYING A POLYVINYL ALCOHOL BINDER

(71) Applicant: Encell Technology, Inc., Alachua, FL (US)

(72) Inventors: Randy Gene Ogg, Newberry, FL (US); Craig Welch, Sarasota, FL (US); Alan Seidel, High Springs, FL (US)

(73) Assignee: ENCELL TECHNOLOGY, INC., Alachua, FL (US)

( * ) Notice: Subject to any disclaimer, the term of this patent is extended or adjusted under 35 U.S.C. 154(b) by 150 days.

This patent is subject to a terminal disclaimer.

(21) Appl. No.: 14/170,043

(22) Filed: Jan. 31, 2014

(65) Prior Publication Data

US 2014/0220441 A1 Aug. 7, 2014

Related U.S. Application Data

(60) Provisional application No. 61/759,777, filed on Feb. 1, 2013, provisional application No. 61/898,115, filed on Oct. 31, 2013.

(51) Int. Cl.
*H01M 4/62* (2006.01)
*H01M 4/04* (2006.01)
*H01M 4/24* (2006.01)
*H01M 4/26* (2006.01)

(52) U.S. Cl.
CPC ........... *H01M 4/622* (2013.01); *H01M 4/0404* (2013.01); *H01M 4/248* (2013.01); *H01M 4/26* (2013.01); *Y02E 60/124* (2013.01)

(58) Field of Classification Search
CPC ...... H01M 4/622; H01M 4/26; H01M 4/248; H01M 4/0404
See application file for complete search history.

(56) References Cited

U.S. PATENT DOCUMENTS

| | | | |
|---|---|---|---|
| 3,630,781 A | 12/1971 | Rampel | |
| 3,679,482 A | 7/1972 | Hardman | |
| 4,021,911 A | 5/1977 | Kononenko et al. | |
| 4,123,568 A * | 10/1978 | Kononenko | H01M 4/26 29/623.5 |
| 4,216,045 A | 8/1980 | Morioka | |
| 4,250,236 A * | 2/1981 | Haschka | H01M 4/248 429/207 |
| 4,335,192 A * | 6/1982 | Oliapuram | H01M 4/02 419/37 |
| 4,971,830 A | 11/1990 | Jensen | |
| 5,429,894 A | 7/1995 | Leap et al. | |
| 5,780,184 A | 7/1998 | Coco et al. | |
| 2008/0057403 A1 | 3/2008 | Issaev et al. | |

(Continued)

OTHER PUBLICATIONS

International Search Report from Corresponding Application No. PCT/US14/14033 mailed May 15, 2014.

(Continued)

*Primary Examiner* — Brittany Raymond
(74) *Attorney, Agent, or Firm* — E. Joseph Gess; Melissa H. Hayworth

(57) ABSTRACT

The present invention provides one with an iron electrode employing a binder comprised of polyvinyl alcohol (PVA) binder. In one embodiment, the invention comprises an iron based electrode comprising a single layer of a conductive substrate coated on at least one side with a coating comprising an iron active material and a binder, wherein the binder is PVA. This iron based electrode is useful in alkaline rechargeable batteries, particularly as a negative electrode in a Ni—Fe battery.

14 Claims, 7 Drawing Sheets

(56) References Cited

U.S. PATENT DOCUMENTS

| | | | |
|---|---|---|---|
| 2010/0291442 A1* | 11/2010 | Wang | H01M 4/0404 429/231.95 |
| 2011/0039159 A1* | 2/2011 | Ryu | H01M 4/364 429/223 |
| 2012/0070746 A1 | 3/2012 | Mikhaylik et al. | |
| 2012/0119153 A1 | 5/2012 | Choi | |
| 2012/0202118 A1 | 8/2012 | Kato et al. | |
| 2013/0017432 A1* | 1/2013 | Roumi | H01M 2/1686 429/145 |

OTHER PUBLICATIONS

International Search Report from Corresponding Application No. PCT/US14/14028 mailed May 21, 2014.

* cited by examiner

IRON ELECTRODE EMPLOYING A POLYVINYL ALCOHOL BINDER

CROSS REFERENCE TO RELATED APPLICATIONS

This application claims priority to U.S. Provisional Application Ser. No. 61/759,777, filed Feb. 1, 2013; and U.S. Provisional Application Ser. No. 61/898,115, filed Oct. 31, 2013, which applications are incorporated herein by reference in their entirety.

BACKGROUND OF THE INVENTION

1. Field of the Invention

The present invention is in the technical field of energy storage devices. More particularly, the present invention is in the technical field of rechargeable batteries employing an iron electrode.

2. State of the Art

Iron electrodes have been used in energy storage batteries and other devices for over one hundred years. In particular, iron electrodes are often combined with a nickel-based positive electrode in alkaline electrolyte to form a nickel-iron (Ni—Fe) battery. The Ni—Fe battery is a rechargeable battery having a nickel(III)oxy-hydroxide positive electrode in combination with an iron negative electrode with an alkaline electrolyte such as potassium hydroxide.

The Ni—Fe battery is a very robust battery which is very tolerant of abuse such as overcharge and overdischarge and can have a very long life. It is often used in backup situations where it can be continuously trickle-charged and last more than 20 years.

Traditionally, the iron electrode active material is produced by dissolving pure iron powder in sulfuric acid, followed by drying and roasting to produce iron oxide ($Fe_2O_3$). The material is washed and partially reduced in hydrogen and partially oxidized to give a mix of Fe and magnetite ($Fe_3O_4$). Additives such as FeS may be added to the active material mass. The negative electrode structure is typically that of a pocket plate construction wherein the active material is introduced into the current collector. The current collector is made up of steel strips or ribbons that are perforated and nickel plated and the strip formed into a tube or pocket with one end left open for introduction of the active material (D. Linden and T. Reddy, Editors, "Handbook of Batteries, Third Edition", McGraw-Hill, © 2002). Alternatively, fine iron powder can be sintered under a reducing atmosphere to yield a sturdy electrode shape.

Both of these methods for producing iron electrodes are expensive, lead to low active material utilization, and poor specific energy. As a result, Ni—Fe batteries have largely been displaced by other battery technologies due to the high cost of manufacturing and low specific energy. While the technology of preparing iron electrodes is well known and the current preferred process for making these electrodes is a pocket design, pocket design electrodes are not cost effective and are complex in manufacturing. Although the theoretical capacity of an iron electrode is high, in practice only a small percentage of this is achieved due to the poor conductivity of iron oxide. In a pocket electrode design, loss of contact to the external matrix surface results in increased polarization and a drop in cell voltage. To avoid this, large amounts of conductive material such as graphite must be added to the active material, further increasing cost and lowering energy density. The industry would be well served by a low cost, high quality and high performance iron electrode design.

The substrate in an electrode is used as a current conducting and collecting material that houses the active material (iron) of the electrode in a mechanically stable design. In current pocket electrode designs, the substrate encompasses the active material and holds the material between two layers of conductor, therefore requiring two substrates per electrode. In this process, pockets are formed by interlocking two perforated Ni-coated strips into which the active material is compressed. While such a design offers long life, the energy density is poor.

An alternative process utilizes a porous sintered structure of iron powder, which is filled with iron hydroxide by either an electrochemical process or by impregnation of the pores with an appropriate iron salt, followed by immersion in alkaline solution. Such electrodes suffer from poor active material loading and corrosion of the iron porous plaque during impregnation, leading to limited life.

To address these short-comings, U.S. Pat. No. 4,236,927 describes a process whereby iron powder and a reducible iron compound are mixed together and sintered into a stable body. This mixture is then sintered at high temperature to form a plate of desired shape. While this eliminates the need for a sintered plaque substrate or pockets of Ni-coated steel, it requires high temperature sintering under hydrogen atmosphere. Such processes add considerable complexity and cost in volume manufacturing.

Other forms of electrode production are known in the art, particularly electrodes of a pasted construction. This type of electrode typically incorporates a binder with the active material, which can then be coated onto a two or three dimensional current collector, dried, and compacted to form the finished electrode.

U.S. Pat. No. 3,853,624 describes a Ni—Fe battery incorporating iron electrodes employing a metal fiber structure which is loaded with sulfurized magnetic iron oxide by a wet pasting method. The plates are electrochemically formed outside the cell to electrochemically attach the iron active material to the plaque structure. Such a process in unwieldy in high volume manufacturing and adds to product cost.

U.S. Pat. No. 4,021,911 describes an iron electrode wherein the iron active mass is spread onto a grid and rolled and dried. The electrode is then treated with an epoxide resin solution to form a solid reinforcing film-like layer on the electrode surface. However, it can be expected that such a surface film would contribute to an insulating nature to the electrode surface, significantly increasing charge transfer resistance and lowering the cell's ability to sustain high charge and/or discharge rates.

Similarly, PTFE has been proposed as a binder system for paste type electrodes for alkaline batteries. U.S. Pat. No. 3,630,781 describes the use of a PTFE aqueous suspension as a binder system for rechargeable battery electrodes. However, to maintain the PTFE powder in suspension, it is necessary to add surfactants to the suspension, which must be removed from the resultant electrode by extensive washing, adding cost and complexity to the manufacturing process. An alternative approach for a PTFE-bonded electrode is described in U.S. Pat. No. 4,216,045 using fluorocarbon resin powder to form a sheet which can be attached to a conductive body. However, the use of PTFE results in a water-repellent surface, which while beneficial in a recombinant battery such as NiCd or NiMH, is detrimental to the performance of a flooded Fe—Ni battery where good contact between the electrode and electrolyte is beneficial.

Pasted electrodes using various binders have been proposed for alkaline electrodes, most particularly for electrodes employing hydrogen-absorbing alloys for NiMH batteries (for example U.S. Pat. No. 5,780,184). However, the desired properties for these electrodes differ significantly from those desired for a high capacity iron electrode. In the case of the MH electrode, high electrode density (low porosity) is required to maintain good electrical contact between the alloy particles and to facilitate solid-state hydrogen diffusion in the alloy. By contrast, high porosity is desirable for iron electrodes due to the low solubility of the iron oxide species. Hence, binder systems developed for other types of alkaline electrodes have not been optimized for Fe—Ni batteries and hence have not found commercial application.

Polyvinyl alcohol (PVA) is a water-soluble synthetic polymer prepared by partial or complete hydrolysis of polyvinyl acetate to remove acetate groups. Due to its excellent resistance to alkaline environments, PVA has been proposed for use in separators for alkaline batteries (e.g. U.S. Pat. No. 6,033,806). Additionally, PVA has been employed as a binder material for certain alkaline battery electrodes, most notably, nickel hydroxide electrodes. However, these electrodes are characterized by a three dimensional structure such as a foam or felt substrate that provides mechanical stability to the finished electrode. Therefore, it is not critical to form a fibrous polymer network to stabilize the active material within the electrode structure.

PVA has generally not been found to be an effective binder in electrode structures that rely on a single substrate material such as nickel plated strip (NPS), expanded metal, or wire mesh. This is because of the relatively poor binding properties relative to more fibrous polymers such as PTFE. PVA does not provide sufficient binding force to prevent premature shedding of active material and delamination from the substrate. For these reasons, more fibrous binders are typically employed, most notably PTFE. However, PTFE suffers from several drawbacks. Since PTFE is not water soluble, it must be introduced into the paste in a colloidal suspension. Such a suspension is unstable and can flocculate, rendering the suspension unusable. A surfactant is used to maintain the PTFE in a colloidal suspension, and such a surfactant can cause foaming during processing and must be completely removed from the electrode prior to cell assembly. Similarly, the suspension can stratify, requiring regular stirring of stored material. A further property of PTFE as a battery electrode binder is that it imparts a hydrophobic nature to the electrode surface. While this may be a desirable property in batteries requiring gas recombination, such as NiCd or NiMH, it is undesirable in a Ni—Fe battery, where such hydrophobicity may hinder access of the electrolyte to iron active material. Other binders have been used in alkaline batteries such as various rubbers, but these materials are generally not water soluble, requiring the use of organic solvents, adding cost and complexity to manufacturing.

PVA has recently been proposed as a component to a binder system for lithium ion batteries employing anode materials that are subject to large volume changes, but requires the addition of polyurethane to provide semi-interpenetrating polymer network (U.S. Pat. No. 7,960,056).

The object of this present invention is to provide a high quality and low cost iron electrode that overcomes the limitations of current state-of-the-art pocket and/or sintered iron electrodes.

SUMMARY OF THE INVENTION

The present invention provides one with a novel iron electrode comprising a Polyvinyl alcohol (PVA) binder. In one embodiment, the iron electrode is prepared using a continuous coating process. Specifically, the invention comprises an iron based electrode comprising a single layer of a conductive substrate coated on at least one side with a coating comprising an iron active material and a binder, wherein the binder is PVA. This iron based electrode is useful in alkaline rechargeable batteries, particularly as a negative electrode in a Ni—Fe battery.

Among other factors, it has been discovered that the PVA is a surprisingly good binder for the preparation of iron electrodes coated onto a single substrate such as perforated foil, expanded metal, or mesh. Specifically, the present invention provides a paste style iron electrode utilizing a single conductive substrate to enable a high capacity iron electrode for use in rechargeable battery system including, but not limited to, Ni—Fe, Ag—Fe, Fe-air, or $MnO_2$—Fe.

DETAILED DESCRIPTION OF THE INVENTION

Figure 1:
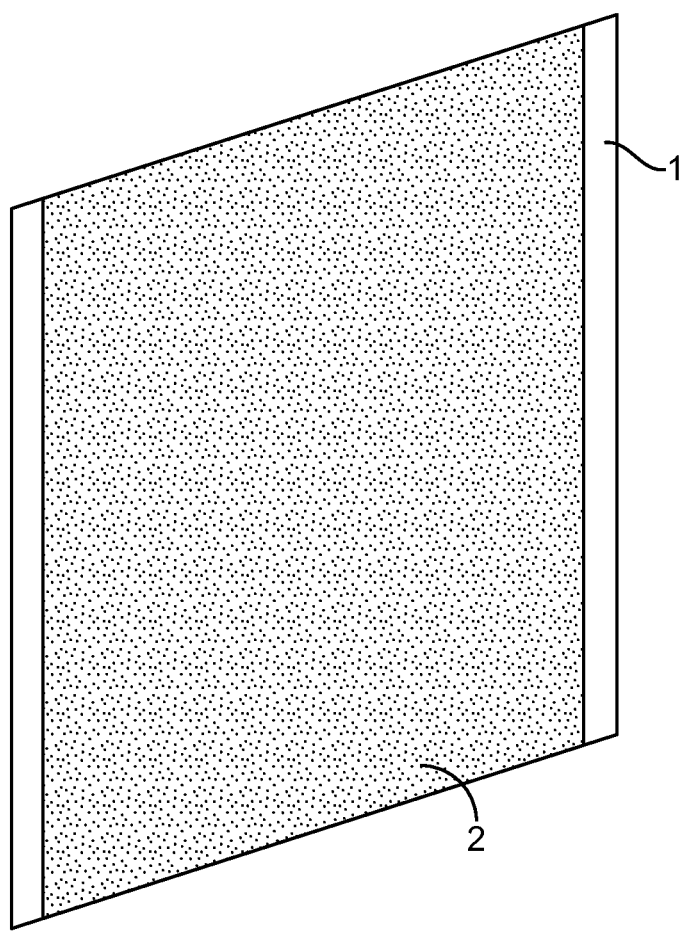
FIG. 1 is a perspective view of a coated iron electrode of the present invention comprising a PVA binder.

The invention comprises an iron electrode comprised of a single, coated conductive substrate employing a PVA binder to affix the active material to the substrate.

In the present invention, a single layer of substrate is used. This single layer acts as a carrier with coated material bonded to at least one side. The substrate may be a thin conductive material such as perforated metal foil or sheet, metal mesh or screen, woven metal, or expanded metal. The substrate may also be a three-dimensional material such as a metal foam or metal felt. In one embodiment, a nickel plated perforated foil has been used.

The coating mixture is a combination of PVA binder and active materials in an aqueous or organic solution. The mixture can also contain other additives such as pore formers, conductive additives such as carbon, graphite, or Ni powder, and reaction promoting additives such as sulfur and sulfur bearing materials such as FeS, Mgs and BiS. Pore formers can be incorporated to enhance electrode porosity. The PVA binder provides adhesion and bonding between the active material particles, both to themselves and to the substrate current collector. Use of a binder to mechanically adhere the active material to the supporting single substrate eliminates the need for expensive sintering or electrochemical post-treatment.

It has been discovered that there are several advantages to employing PVA as a binder in an iron electrode of the present invention versus conventional binders. PVA is readily water soluble, simplifying the manufacturing process by allowing for direct addition of a PVA solution to the active material mix and eliminating issues associated with shelf life common with PTFE binders. This property permits ready use in a continuous coating process. PVA does not impart a hydrophobic nature to the electrode surface, insuring good contact between the active material and the alkaline electrolyte. It has also been found that PVA minimizes any increase in cell resistance and offers the highest mAh/g capacity when used in an iron electrode.

PVA can be added to the active material paste in the form of a concentrated solution or in powder form. PVA that is hydrolyzed between 98.5 and 100% is preferred in one embodiment. A most preferred embodiment uses PVA that is hydrolyzed between 99.0 and 100%. Furthermore, the PVA has a 4% water solution viscosity between 3-70 cP at 20° C. In a preferred embodiment, the viscosity of a 4% water solution of the PVA is between 20-40 cP at 20° C. In a most preferred embodiment, the viscosity of a 4% water solution of the PVA is between 27-33 cP at 20° C. Concentrations of PVA in the final paste formulation are 1 to 10% by total weight. Preferred concentrations of PVA are in the range of 1 to 5% and a most preferred concentration of PVA in the paste is between 2.5 to 4%. Lower concentrations of PVA do not provide sufficient binding of the active material, while higher concentrations result in an increase in electrode electrical resistance, degrading the performance of the battery under high current loads.

While PVA is not generally considered an acceptable binder for electrodes employing a single substrate, the unique properties of the pasted iron electrode of this invention enable its use as a binder. During electrochemical cycling of the iron electrode, iron is converted to iron oxides and iron hydroxides which are only very sparingly soluble in the electrolyte. Therefore, these reactions occur at the surface of the iron particles. During charge, as the iron oxides and iron hydroxides are reduced back to iron metal, the small iron particles effectively fuse together, providing strong mechanical binding between active material particles. Thus, unlike conventional battery electrodes that undergo mechanical swelling and shrinking which result in physical degradation of the electrode over time, the iron electrode physical strength improves with charge/discharge cycling. It is this distinction that enables the use of PVA as a binder for an iron electrode, and allows one to successfully take advantage of PVA and its desirable properties, as discussed above.

The active material for the mix formulation is selected from iron species that can be reversibly oxidized and reduced. Such materials include iron metal, iron oxide materials and mixtures thereof. The iron oxide material will convert to iron metal when a charge is applied. A suitable iron oxide material includes $Fe_3O_4$. A preferred form of iron is hydrogen reduced with a purity of about 96% or greater and having a 325 mesh size. In addition, other additives may be added to the mix formulation. These additives include but are not limited to sulfur, antimony, selenium, tellurium, bismuth, tin, and metal sulfides and conductivity improvers such as nickel.

Sulfur as an additive has been found to be useful in concentrations ranging from 0.25 to 1.5% and higher concentrations may improve performance even more. Nickel has been used as a conductivity improver and concentrations ranging from 8 to 20% have been found to improve performance and higher concentrations may improve performance even more.

Figure 2:
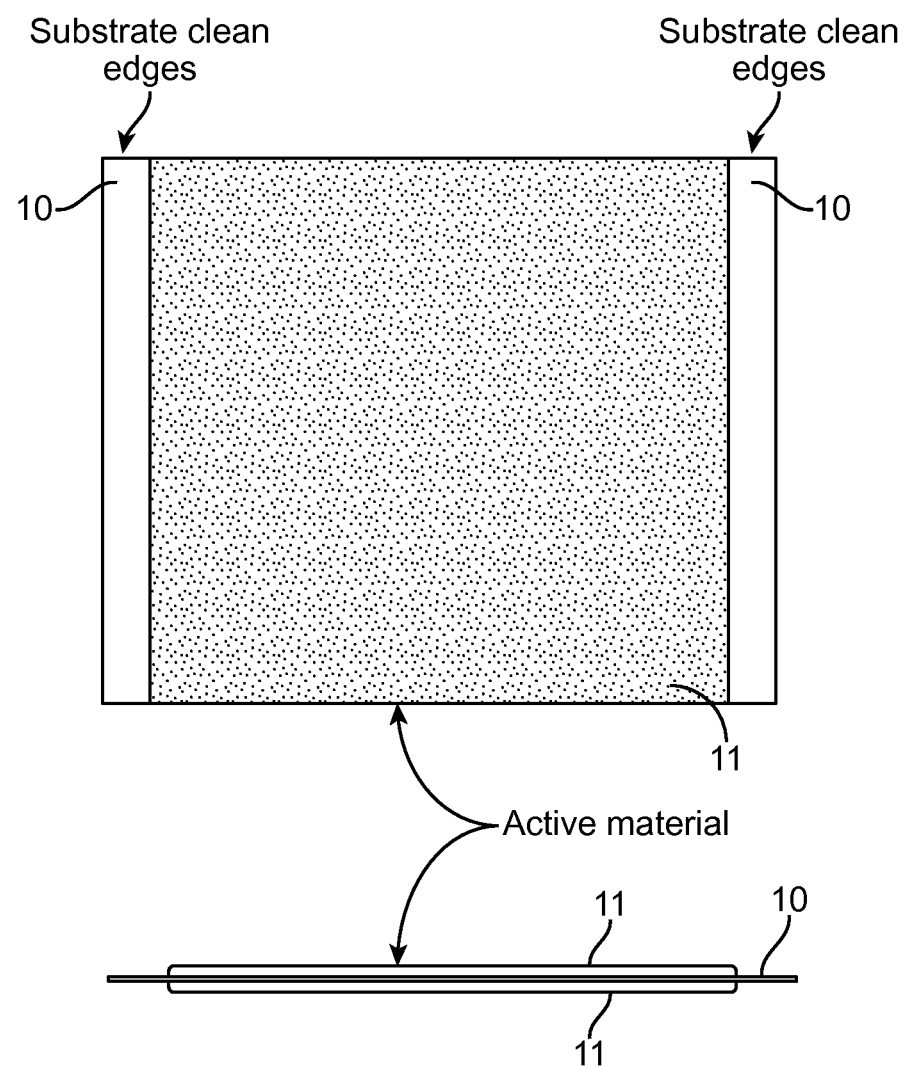
FIG. 2 is a side view and cross-section view of an iron electrode coated on both sides of the substrate in accordance with the present invention.

Turning to the figures of the drawing, FIG. 1 is a prospective view of a coated iron electrode. The substrate 1 is coated on each side with the coating 2 comprising the iron active material and binder. This is further shown in FIG. 2. In FIG. 2, the substrate 1 is coated on each side with the coating 2 of the iron active material and binder. The substrate may be coated continuously across the surface of the substrate, or preferably, as shown in FIGS. 1 and 2, cleared lanes of substrate may be uncoated to simplify subsequent operations such as welding of current collector tabs.

Figure 3:
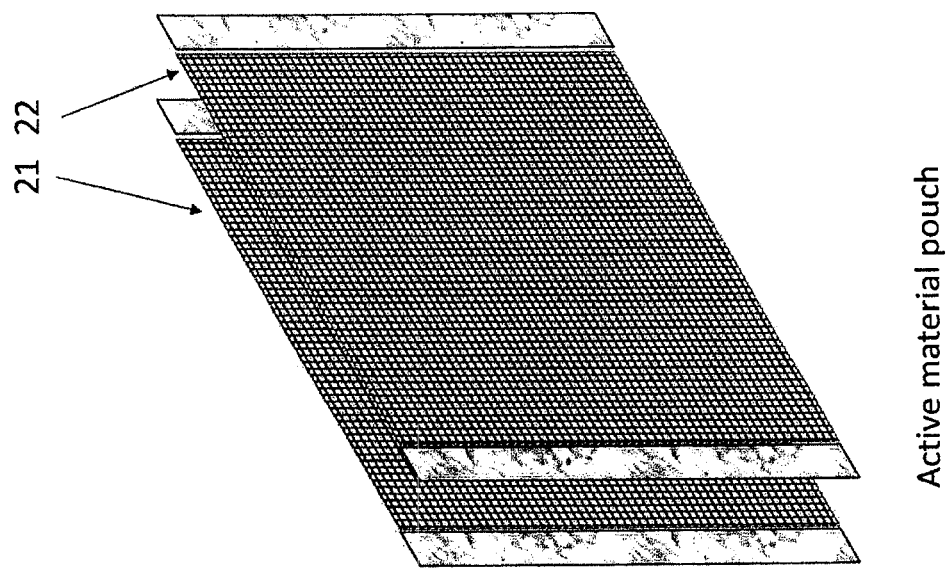
FIG. 3 is a perspective view of a current pocket iron electrode.
Figure 4:
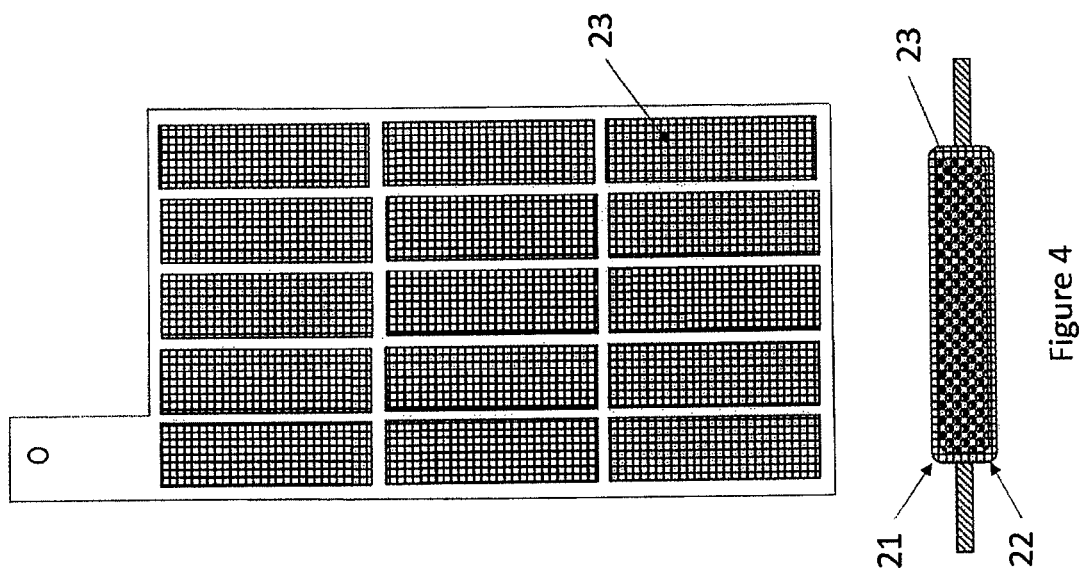
FIG. 4 is a side view and a cross-section view of a current pocket iron electrode.

FIGS. 3 and 4 of the drawing show a conventional pocket iron electrode. In FIG. 3, the two substrates 21 and 22 are shown to form the pocket which holds the iron active material. In FIG. 4, the iron active material 23 is held between the two substrates 21 and 22.

ILLUSTRATIVE EXAMPLES

Paste Preparation

A water based paste comprised of hydrogen reduced iron powder (325 mesh size), 16% nickel powder #255, 0.5% elemental sulfur powder (precipitated, purified) and the appropriate amount of binder was prepared using a digital stirring device and 3-wing stirring blade operating at 1300 RPM for 10-15 minutes. Deionized water was added to the mixture to create a paste with a viscosity between 120,000-130,000 cP.

Example 1

Figure 5:
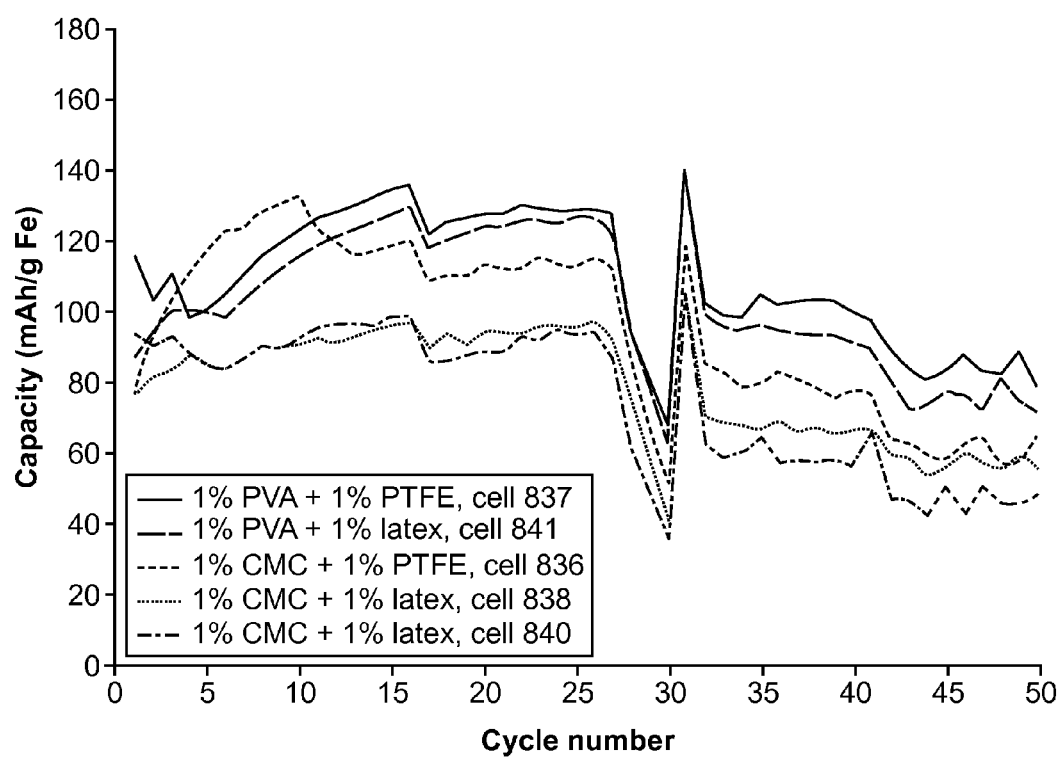
FIG. 5 shows cycling data for cells with different concentrations of PVA in the iron electrode.

A series of iron electrodes were prepared by impregnating nickel foam with various pastes comprising several different binder compositions described in Table 1. The discharge capacities of the individual cells prepared from these electrodes were measured and plotted against the amount of iron in the anode in FIG. 5. The effect of rate on capacity was evaluated by discharging the cells at multiple rates of C/10, C/5, C/2, and 2C where C represents the current required to discharge the cell in one hour.

TABLE 1

| Cell # | Binder | Binder | g of iron |
| --- | --- | --- | --- |
| 1 | 1% CMC | 1% PTFE | 6.4 |
| 2 | 1% PVA | 1% PTFE | 8.5 |
| 3 | 1% CMC | 1% AL-2002 latex | 7.9 |
| 4 | 1% CMC | 1% AL-3001 latex | 7.4 |
| 5 | 1% PVA | 1% AL-1002 latex | 8.3 |

Since the binder can contribute to electrode resistance, it is desirable to employ a binder that minimizes an increase in cell resistance and offers the highest mAh/g capacity. Comparing the 2C capacities of the Ni—Fe batteries, the best results at 2C discharge rate were obtained in cells employing PVA as a binder.

Example 2

Water based pastes (Table 2) were applied to a 1.63" wide nickel-plated perforated strip with 2-mm perforations by feeding the strip fed through the top of an open-bottomed pot attached to a doctor-blade fixture with a gap width set to 0.068". The paste mixture is poured into the pot and the perforated strip is pulled down at a rate of 2.7 ft/min coating the perforated strip with the paste mixture. Segments ranging 4-5" are cut from the coated strip and placed into a drying oven at 150° C. for 20 minutes.

TABLE 2

| Sample | PVA concentration (%) | Iron in electrode (g) | Capacity (mAh/g Fe) |
|---|---|---|---|
| 1 | 3.5 | 8.3 | 117 |
| 2 | 3.5 | 8.45 | 116 |
| 3 | 3.5 | 11.4 | 112 |
| 4 | 5 | 8.25 | 89 |
| 5 | 7 | 10.1 | 69 |
| 6 | 9 | 8.55 | 8 |

After drying the coated strips were cut to a standard length of 3" and then compressed to thickness to achieve a porosity of approximately 40%. Dried paste mixture was removed from the top 0.25" of the strip in order to provide a clean space for a stainless steel tab to be spot-welded.

A series of continuously coated iron electrodes were prepared by coating perforated NPS with an aqueous mixture of iron powder, nickel powder as a conductivity aid, elemental sulfur and employing PVA as a binder. Multiple levels of PVA were employed in the mixes to evaluate the effect of binder concentration on mechanical stability of the electrode and rate capability of the electrode. At concentrations below 2 weight percent PVA, the physical integrity of the electrodes was unacceptable. Concentrations of binder above about 5 weight percent showed a sharp drop in discharge capacity, most likely due to increased electrode resistance and possibly masking of the active material from the electrolyte interface. Data for cells with varying levels of PVA is summarized in Table 2.

Example 3

A 10 wt % solution of PVA (Elvanol 7130) preheated to between 120-125° F. was added to a jacketed container with iron powder (325 mesh), nickel powder #255, and sulfur preheated to 120° F. This mixture was stirred for 30 minutes at 120° F. The solid component mixture of this paste was 80% iron, 16% nickel, 0.4% sulfur, and 3.5% PVA. Viscosity measurements of the paste had a range of 25000 to 39000 cP immediately after removal from the container and after a further 90 seconds, the viscosity ranged from 22000 to 31000 cP.

The paste mixture was then transferred to a jacketed holding tank preheated to 110° F. where it was stirred. The paste was pumped to a paste hopper where a perforated nickel plated steel strip was coated. The coated strip was then passed through a doctor blade to achieve a coating thickness between 0.040-0.050" and introduced to a vertical drying oven. The first stage of drying consisted of IR heating at 240° F. for 1.67 minutes followed by heating in a conventional oven at 240° F. for 3.35 minutes. The second drying stage with a residence time of 1.7 minutes consisted of forced hot air with a set drying temperature of 260° F. The paste temperature exiting the ovens did not exceed 210° F. After cooling, the finished coating was calendared to a thickness of 0.025". Pieces of the coating were cut to size and weighed to obtain coating porosity. The porosity ranged from 34-43% with a targeted porosity of 38%.

Electrodes from Example 3 were used to construct a Ni—Fe battery. Table 3 shows the performance of the iron electrode in comparison to other commercial Ni—Fe batteries employing pocket plate electrodes.

TABLE 3

| Cell | Chinese Seiden | Chinese Taihang | Ukrainian | Russian | Zappworks | Electrode of present invention |
|---|---|---|---|---|---|---|
| Ah/g (powder) | 0.095 Ah/g | 0.130 Ah/g | 0.117 Ah/g | 0.116 Ah/g | — | 0.126 Ah/g |
| Ah/g (total electrode) | 0.059 Ah/g | 0.076 Ah/g | 0.075 Ah/g | 0.084 Ah/g | 0.034 Ah/g | 0.105 Ah/g |
| Ah/cm$^3$ (total electrode) | 0.199 Ah/cm$^3$ | 0.203 Ah/cm$^3$ | 0.216 Ah/cm$^3$ | 0.238 Ah/cm$^3$ | 0.099 Ah/cm$^3$ | 0.430 Ah/cm$^3$ |
| Type of iron electrode | Pocket plate | Pocket plate | Pocket plate | Pocket plate | Pocket plate | Continuous coated (Pasted) |

Example 4

Paste Preparation

A water based paste comprised of hydrogen reduced iron powder (325 mesh size), nickel powder #255, elemental sulfur powder (precipitated, purified) and the appropriate amount of binder was prepared using a digital stirring device and 3-wing stirring blade operating at 1300 RPM for 10-15 minutes. Deionized water was added to the mixture to create a paste with a viscosity between 120,000-130,000 cP. The nickel and iron content was varied according to Table 3, the sulfur content was 0.5%, and the binder content was 3.5%.

Water based pastes with varying nickel and iron content (Table 4) were applied to a 1.63" wide nickel-plated perforated strip with 2-mm perforations by feeding the strip fed through the top of an open-bottomed pot attached to a doctor-blade fixture with a gap width set to 0.068". The paste mixture is poured into the pot and the perforated strip is pulled down at a rate of 2.7 ft/min coating the perforated strip with the paste mixture. Segments ranging 4-5" are cut from the coated strip and placed into a drying oven at 150° C. for 20 minutes.

TABLE 4

| Sample | Nickel (%) | Iron % |
|---|---|---|
| 1 | 8 | 88 |
| 2 | 12 | 84 |
| 3 | 16 | 80 |
| 4 | 20 | 76 |

After drying the coated strips were cut to a standard length of 3" and then compressed to thickness to achieve a porosity of approximately 40%. Dried paste mixture was removed from the top 0.25" of the strip in order to provide a clean space for a stainless steel tab to be spot-welded onto.

Figure 6:
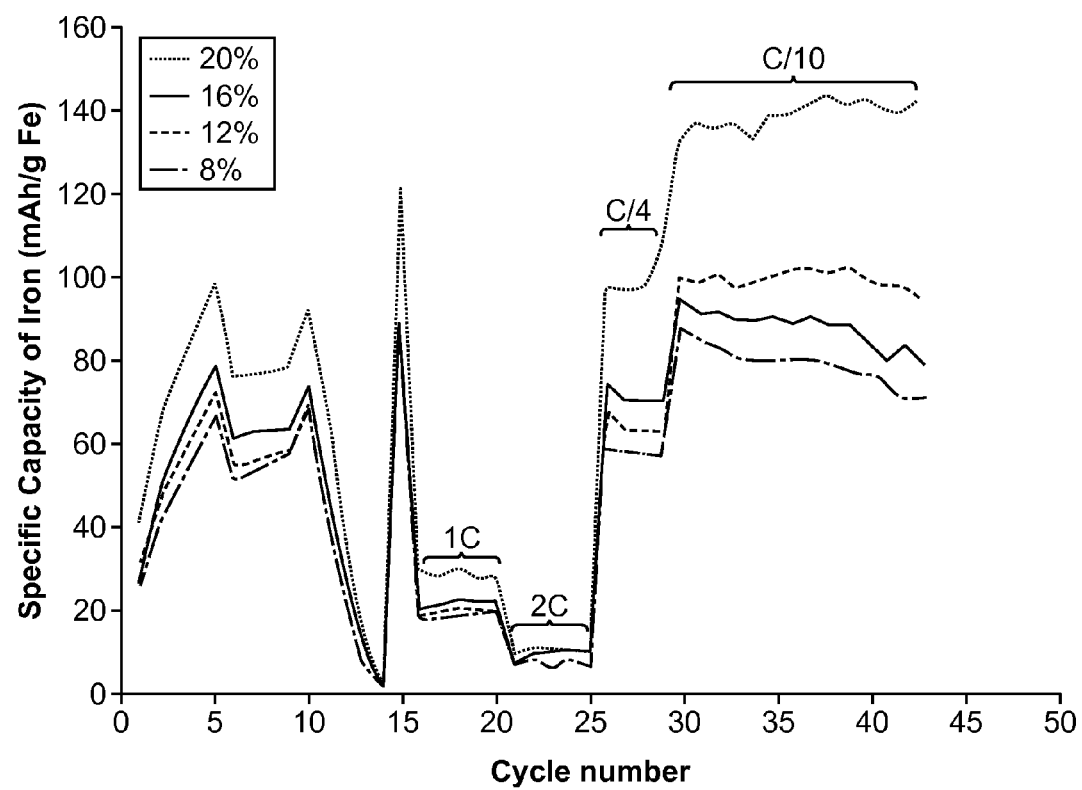
FIG. 6 is discharge capacities for Ni—Fe cells with iron electrodes having varied nickel and iron content.

Ni—Fe cells were constructed using electrodes fabricated from the pastes with varying nickel and iron content. The data is shown in FIG. 6. The cell performance does not appear to be very dependent upon nickel concentration in the concentration range between 8-16% but improved capacity at high (1 C) and low rates (C/10) is observed for electrodes with 20% nickel.

Examples 5

Paste Preparation

A water based paste comprised of hydrogen reduced iron powder (325 mesh size), nickel powder #255, elemental sulfur powder (precipitated, purified) and the appropriate amount of binder was prepared using a digital stirring device and 3-wing stirring blade operating at 1300 RPM for 10-15 minutes. Deionized water was added to the mixture to create a paste with a viscosity between 120,000-130,000 cP. The nickel content was 16%, polyvinyl alcohol 3.5%, and the sulfur content was varied between 0 and 1.5% with the remainder of the electrode composition being iron powder.

Water based pastes with varying sulfur content were applied to a 1.63" wide nickel-plated perforated strip with 2-mm perforations by feeding the strip fed through the top of an open-bottomed pot attached to a doctor-blade fixture with a gap width set to 0.068". The paste mixture is poured into the pot and the perforated strip is pulled down at a rate of 2.7 ft/min coating the perforated strip with the paste mixture. Segments ranging 4-5" are cut from the coated strip and placed into a drying oven at 150° C. for 20 minutes.

After drying the coated strips were cut to a standard length of 3" and then compressed to thickness to achieve a porosity of approximately 40%. Dried paste mixture was removed from the top 0.25" of the strip in order to provide a clean space for a stainless steel tab to be spot-welded onto.

Figure 7:
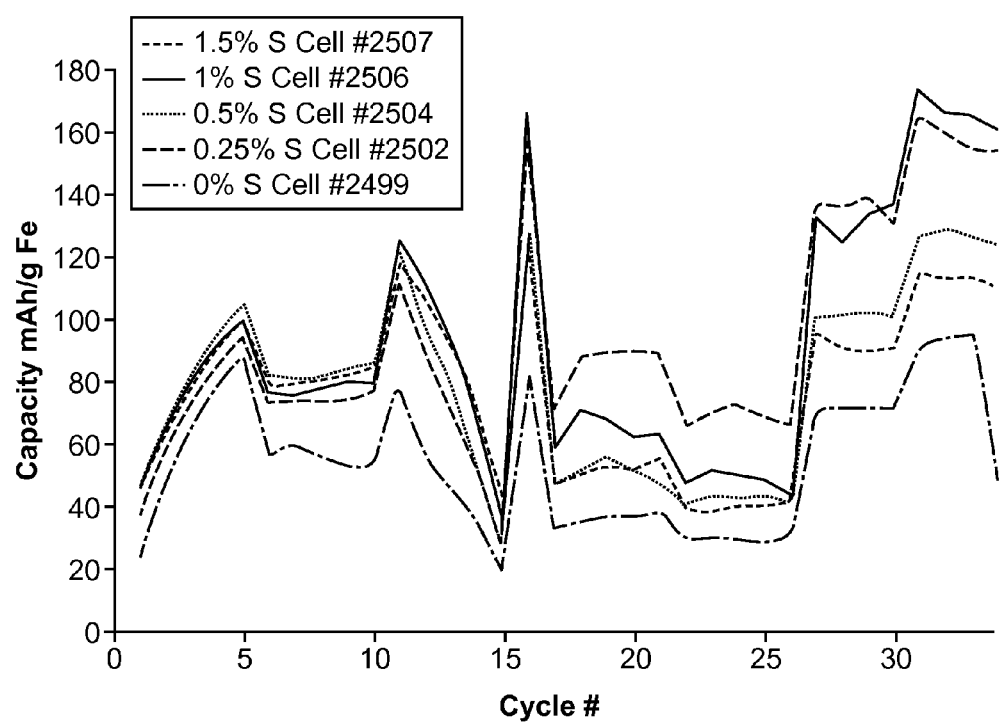
FIG. 7 is discharge capacities for Ni—Fe cells with iron electrodes having varied sulfur content.

Ni—Fe cells were constructed using electrodes fabricated from the pastes with varying sulfur content. The data is shown in FIG. 7. Increasing the sulfur content of the electrode increases the capacity at the C/10 discharge rate until the sulfur content reaches about 1.5% where there is no further increase in capacity. Increasing the sulfur content increased the capacity of the iron electrode even at sulfur contents up to 1.5% at the 1 C and 2C discharge rates.

In the foregoing examples, the invention Ni—Fe battery used an electrolyte comprised of sodium hydroxide (NaOH), lithium hydroxide (LiOH), and sodium sulfide ($Na_2S$). A sintered nickel electrode impregnated with nickel hydroxide was used as the positive electrode in the foregoing examples using the iron electrode of the present invention. The separator used in the inventive Ni—Fe battery was a 0.010 inch thick polyolefin non-woven mesh. The electrolyte used in the conventional Ni—Fe battery was potassium hydroxide (KOH), and the anode and cathode was kept electrically isolated using a spacer. The results show a vast improvement in performance characteristics for the inventive Ni—Fe battery.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. An iron electrode comprising an active iron material, sulfur and a polyvinyl alcohol binder in an amount of from 2 to 5 wt %.

2. The iron electrode of claim 1, wherein the sulfur comprises elemental sulfur.

3. The iron electrode of claim 1, wherein the iron electrode further comprises a nickel additive.

4. The iron electrode of claim 1, wherein the active iron material comprises iron metal, an iron oxide material, or a mixture thereof.

5. The iron electrode of claim 4, wherein the iron oxide material comprises $Fe_3O_4$.

6. The iron electrode of claim 1, wherein the polyvinyl alcohol binder comprises polyvinyl alcohol that is hydrolyzed between 98.5 and 100%.

7. The iron electrode of claim 1, wherein the polyvinyl alcohol binder comprises polyvinyl alcohol that is hydrolyzed between 99 and 100%.

8. The iron electrode of claim 1, wherein the polyvinyl alcohol binder comprises from 2.5 to 4 wt % of the iron electrode.

9. A paste formulation for an iron electrode which comprises an active iron material, sulfur and from 2 to 5 wt % of a polyvinyl alcohol binder.

10. The paste formulation of claim 9, wherein the formulation comprises from 2.5 to 4 wt % polyvinyl alcohol binder.

11. The paste formulation of claim 9, wherein the sulfur comprises elemental sulfur.

12. The paste formulation of claim 9, further comprising 1 nickel additive.

13. The paste formulation of claim 9, wherein the active iron material comprises iron metal, an iron oxide material, or a mixture thereof.

14. The paste formulation of claim 13, wherein the iron oxide material comprises $Fe_3O_4$.

* * * * *